(12) United States Patent
Prestella

(10) Patent No.: US 9,352,703 B2
(45) Date of Patent: May 31, 2016

(54) ADAPTABLE WATERTIGHT BARRIER

(71) Applicant: Thomas Joseph Prestella, Sherwood, AR (US)

(72) Inventor: Thomas Joseph Prestella, Sherwood, AR (US)

( * ) Notice: Subject to any disclaimer, the term of this patent is extended or adjusted under 35 U.S.C. 154(b) by 0 days.

(21) Appl. No.: 14/493,497

(22) Filed: Sep. 23, 2014

(65) Prior Publication Data

US 2016/0082898 A1    Mar. 24, 2016

(51) Int. Cl.
   *B60R 13/01*    (2006.01)
   *B62D 65/02*    (2006.01)
   *B62D 33/02*    (2006.01)

(52) U.S. Cl.
   CPC ............... *B60R 13/01* (2013.01); *B62D 33/02* (2013.01); *B62D 65/024* (2013.01)

(58) Field of Classification Search
   CPC ................................. B60R 13/01; B60P 1/286
   USPC ........................................ 296/39.1, 39.2, 37.6
   See application file for complete search history.

(56) References Cited

U.S. PATENT DOCUMENTS

| | | | | |
|---|---|---|---|---|
| 3,418,005 A * | 12/1968 | Allina | ................ | B62B 1/08 280/47.26 |
| 4,279,439 A | 7/1981 | Cantieri | | |
| 4,877,281 A * | 10/1989 | Altmann | ................ | B60R 13/01 220/495.01 |
| 5,167,433 A * | 12/1992 | Ryan | ................ | B60R 13/01 220/533 |
| 5,201,562 A * | 4/1993 | Dorsey | ................ | A61H 33/028 296/37.6 |
| 5,221,119 A * | 6/1993 | Emery | ................ | B60R 13/01 220/495.01 |
| 5,366,124 A * | 11/1994 | Dearborn, IV | ................ | B60P 7/08 224/404 |
| 5,551,742 A * | 9/1996 | Martindale | ................ | B60R 13/01 296/39.2 |
| 6,059,343 A * | 5/2000 | Emery | ................ | B60R 13/01 296/39.1 |
| D483,314 S | 12/2003 | Graves | | |
| 6,964,421 B2 * | 11/2005 | Friel | ................ | B62B 1/20 280/47.31 |
| 2006/0170237 A1* | 8/2006 | McAuliffe, Jr. | ................ | B60R 13/011 296/39.1 |
| 2008/0211251 A1* | 9/2008 | Diloreto | ................ | B60R 13/01 296/39.2 |
| 2008/0303303 A1* | 12/2008 | Valentine | ................ | B60R 5/04 296/39.1 |
| 2009/0033121 A1* | 2/2009 | McGorman | ................ | B65F 1/0006 296/39.1 |
| 2012/0261938 A1* | 10/2012 | Roach | ................ | B60P 7/0892 296/39.2 |
| 2013/0323004 A1* | 12/2013 | Bemis | ................ | B60P 1/64 414/800 |
| 2014/0265412 A1* | 9/2014 | Ellis | ................ | B60R 9/00 296/39.2 |

* cited by examiner

*Primary Examiner* — Gregory Blankenship
(74) *Attorney, Agent, or Firm* — Dunlap Bennett & Ludwig PLLC

(57) ABSTRACT

An adaptable barrier for transforming a cavity defined by at least one rail into a watertight compartment, wherein the watertight compartment may conform to various sized cavities while attaching thereto. The adaptable barrier may include a base sheet having a front edge joined to a sidewall comprising a more elastic material, forming the watertight compartment, whose opening is defined by a second edge. A peripheral rim is joined along the second edge, wherein the peripheral rim may be positionable from a folded up position to a folded down position engaging the at least one rail.

9 Claims, 4 Drawing Sheets

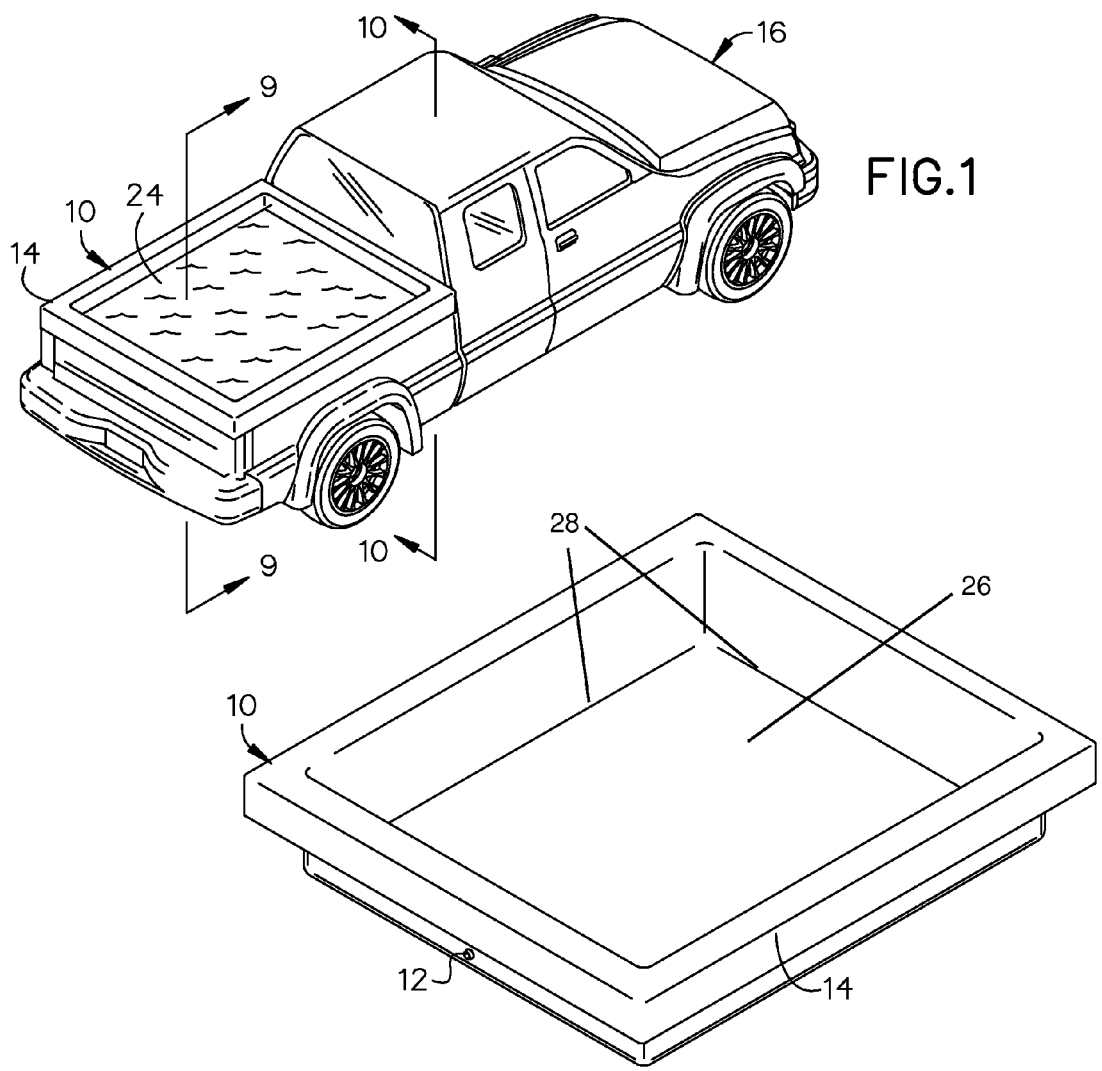
FIG.1
FIG.2
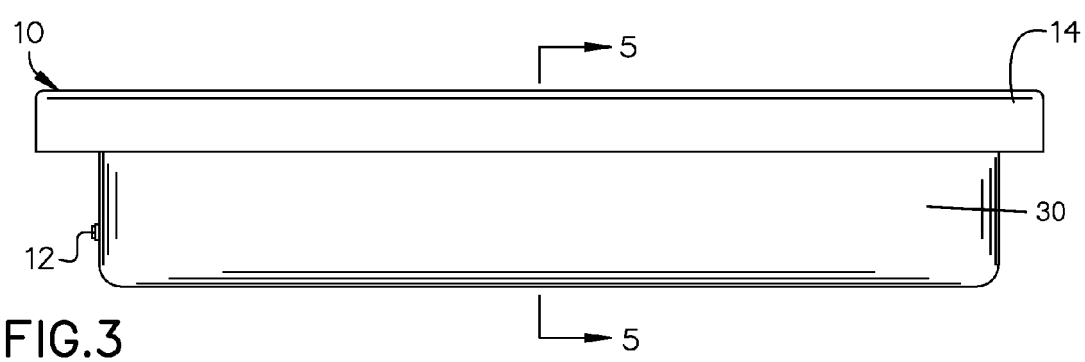
FIG.3

ADAPTABLE WATERTIGHT BARRIER

BACKGROUND OF THE INVENTION

The present invention relates to watertight barriers and, more particularly, to an apparatus providing a watertight barrier to a pick-up truck bed.

Truck beds are inherently not watertight. This is because they are manufactured to allow liquids to pass freely through cracks formed on the bottom and sides of the tailgate when the tailgate is in the closed position. Also, many truck beds are manufactured with drains at the low points (to prevent rain and moisture accumulation).

Lining truck beds with conventional tarps to make them watertight is labor intensive and inefficient. The one-dimensional square or rectangular shape of a tarp makes it difficult to effectively line the interior of a multi-dimensional truck bed. Also, they require many abrasive ropes and/or bungee cords to hold them in place, which is problematic because tarps tend to be designed to deflect water not contain large quantities of it in a confined space. As a result, they easily tear at the tie-down points or burst under the intense stress caused by holding large amounts of weight.

Pickup truck bed inserts of various types are known in the prior art to accommodate fluid filling for bathing and recreation events. However, such inserts are hard and rigid in construction, tailored for only one specific truck bed design, and so would require impractical numerous dimension alterations to be received by various truck bed designs and wheel well housings.

As can be seen, there is a need for an apparatus for creating a watertight barrier within a truck bed, wherein the apparatus is adaptable to the interior dimensions of various truck bed designs, and can be self-secured without abrasive ropes or bungee cords.

SUMMARY OF THE INVENTION

In one aspect of the present invention, an adaptable barrier for reception within a cavity defined by at least one elongated object, providing a watertight compartment therein, comprises: a base sheet comprising a front edge; a sidewall comprising an elastic material, wherein the sidewall comprises a first edge and a second edge, wherein the base sheet and the sidewall are connected along the front edge and the first edge, forming the watertight compartment, wherein an opening is defined by the second edge; and a peripheral rim comprising malleable material, wherein the peripheral rim is joined along the second edge, and wherein the peripheral rim is positionable in a folded up position to a folded down position operably engaging the at least one elongated object, whereby the peripheral rim urges a hugging effect on the at least one elongated object.

In another aspect of the present invention, a method of providing a watertight compartment within a cavity defined by at least one elongated object, comprises the steps of: providing an adaptable barrier comprising a base sheet comprising a front edge; a sidewall comprising an elastic material, wherein the sidewall comprises a first edge and a second edge, wherein the base sheet and the sidewall are connected along the front edge and the first edge, forming the watertight compartment, wherein an opening is defined by the second edge; and a peripheral rim comprising malleable material, wherein the peripheral rim is joined along the second edge, and wherein the peripheral rim is positionable in a folded up position to a folded down position operably engaging the at least one elongated object; placing the adaptable barrier within the cavity; and positioning the peripheral rim to the folded down position so as to operably engage the at least one elongated object.

In yet another aspect of the present invention, an adaptable barrier for reception within a cavity defined by at least one elongated object, providing a watertight compartment therein, comprises: a base sheet comprising a front edge; a sidewall comprising an elastic material, wherein the sidewall comprises a first edge and a second edge, wherein the base sheet and the sidewall are connected along the front edge and the first edge, forming the watertight compartment, wherein an opening is defined by the second edge, and wherein the sidewall provides a drain conduit; and a peripheral rim pivotably joined to the second edge, wherein the peripheral rim is a L-shaped component of malleable material formed and biased in the L-shape, wherein two legs of the L-shaped component are pivotably positionable to form at least an I-shape, and wherein the peripheral rim is positionable in a folded up position to a folded down position operably engaging the at least one elongated object, whereby the peripheral rim urges a hugging effect on the at least one elongated object.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, illustrated in use;

FIG. 2 is a perspective view of an exemplary embodiment of the present invention;

FIG. 3 is a side view of an exemplary embodiment of the present invention;

DETAILED DESCRIPTION OF THE INVENTION

Figure 4:
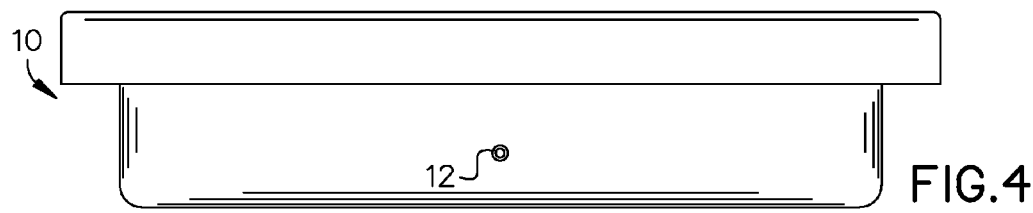
FIG. 4 is a front view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an adaptable barrier for transforming a cavity defined by at least one rail into a watertight compartment, wherein the watertight compartment may conform to various sized cavities while attaching thereto. The adaptable barrier may include a base sheet having a front edge joined to a sidewall comprising a more elastic material, forming the watertight compartment, whose opening is defined by a second edge. A peripheral rim is joined along the second edge, wherein the peripheral rim may be positionable from a folded up position to a folded down position engaging the at least one rail.

Referring to FIGS. 1 through 11, the present invention may include an adaptable barrier 10. The adaptable barrier 10 may include a substantially flat base sheet 26 and an adaptable sidewall 30 providing a peripheral rim 14. The base sheet 26 may be made of material that can be repeatedly bent without fracturing, such as polyethylene, polypropylene, vinyl, nylon, rubber, various impregnated or laminated fibrous materials, various plasticized materials and the like, and have a front edge 28. The adaptable sidewall 30 may be made of elastic material to form a generally tubular configuration with a first edge 28 and a second edge 34. The base sheet 26 and the adaptable sidewall 30 may be connected along the front edge 28 and the first edge 28 forming a generally 90 degree angle defining a box-like compartment, having an opening defined by the second edge 34, as illustrated in FIG. 2. Such connections may be provided by a bonding process, such as heat sealing, welding, applying adhesive glue, a combination thereof or the like. In a certain embodiment, the adaptable sidewall 30 may be a unitary construction. In an alternative embodiment, the adaptable sidewall 30 may be comprised of a plurality of constituent wall segments.

In certain embodiments, the base sheet 26 may have four sides along the front edge 28 forming a rectangular shape complementing of a rectangular-shaped first edge 28. The dimensions of the rectangular base sheet 26 may be adapted to accommodate any truck bed dimensions.

Figure 5:
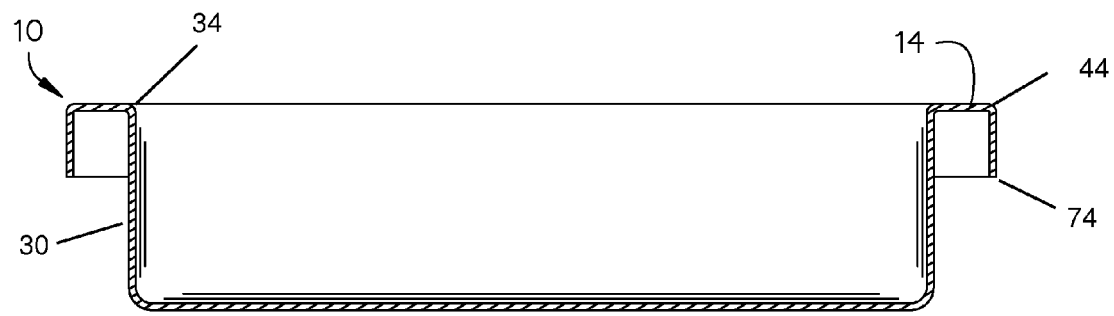
FIG. 5 is a section view of an exemplary embodiment of the present invention, taken along line 5-5 in FIG. 3.
Figure 6:
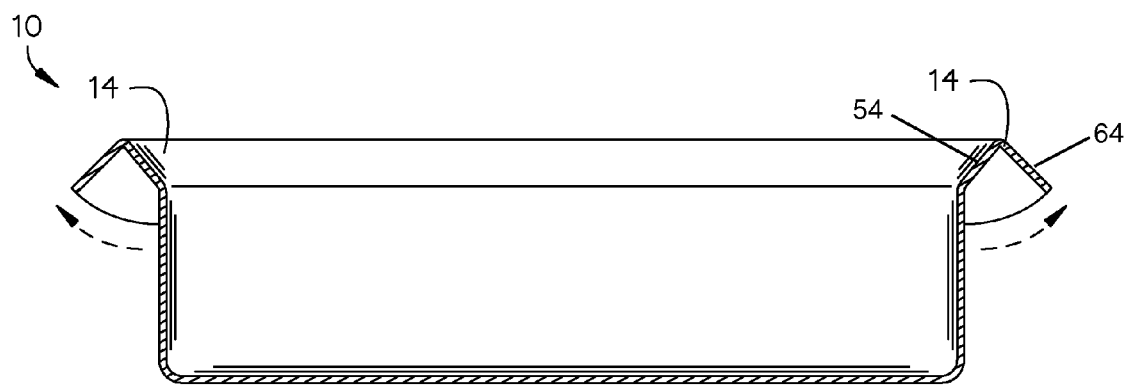
FIG. 6 is a section view of an exemplary embodiment of the present invention, illustrating a peripheral rim in a folded up position.
Figure 7:
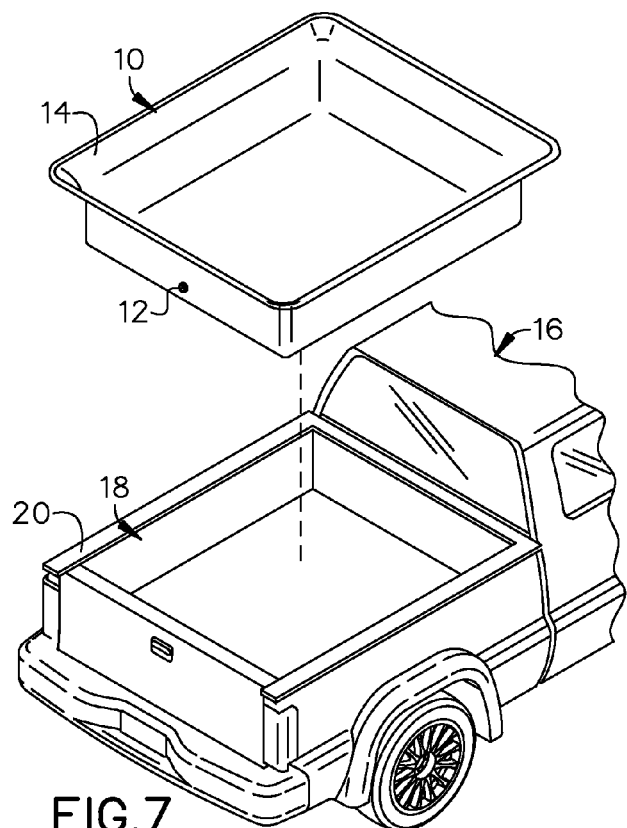
FIG. 7 is an exploded view of an exemplary embodiment of the present invention.
Figure 8:
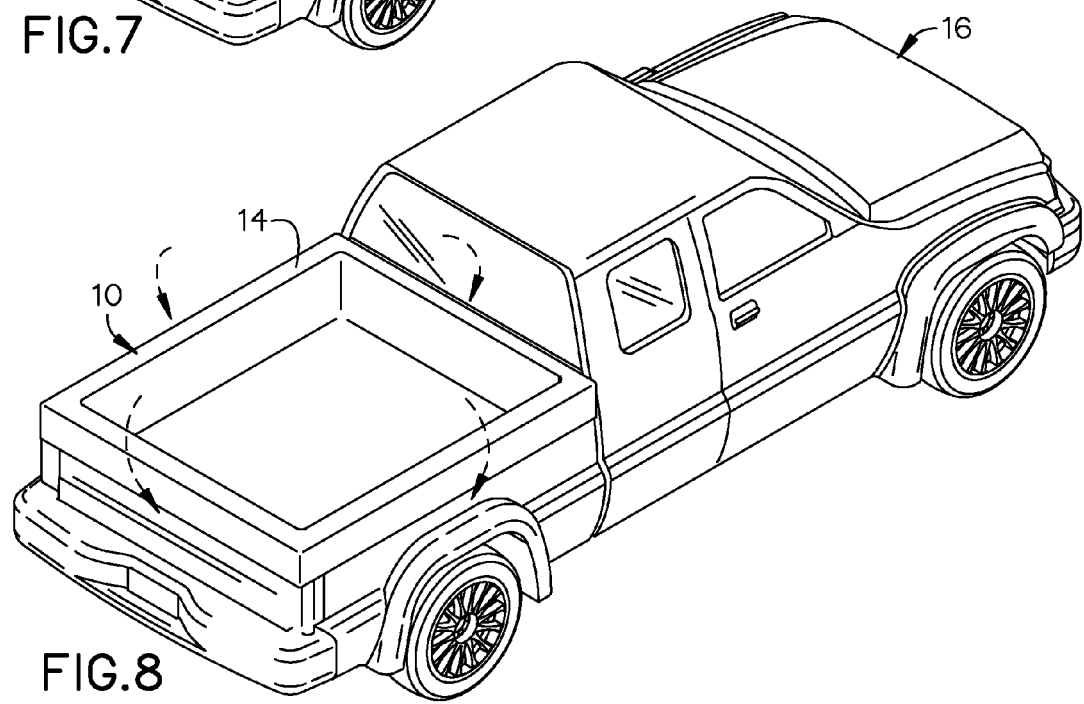
FIG. 8 is a section view of an exemplary embodiment of the present invention, illustrating the peripheral rim in a folded down position.
Figure 9:
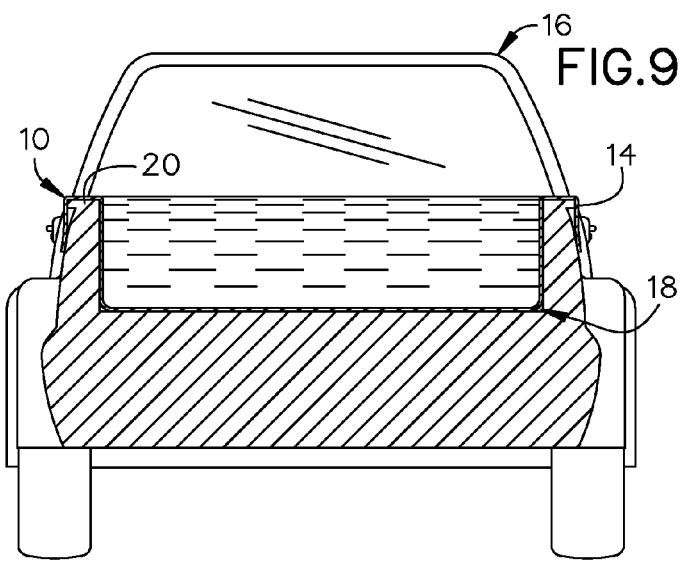
FIG. 9 is a section view of an exemplary embodiment of the present invention, taken along line 9-9 in FIG. 1.
Figure 10:
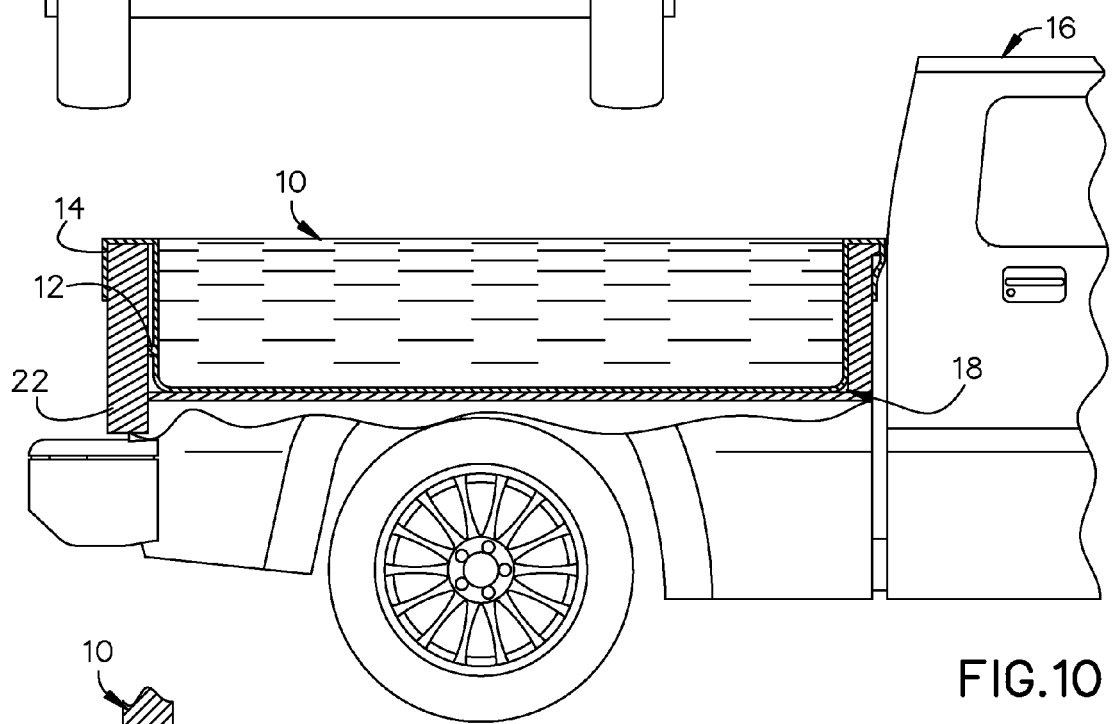
FIG. 10 is a section view of an exemplary embodiment of the present invention, taken along line 10-10 in FIG. 1.
Figure 11:
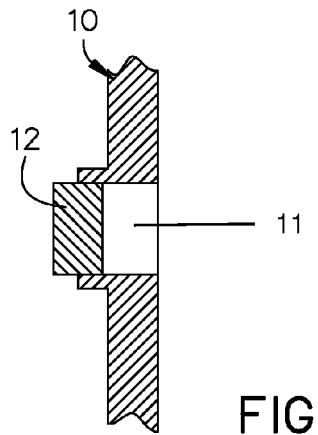
FIG. 11 is a section detail view of an exemplary embodiment of the present invention.

The second edge 34 may provide a generally U-shaped peripheral rim 14 made of a malleable material forming at least one component. The peripheral rim 14 may be formed by bonding a first planar component 54 along the second edge 34 so that it perpendicularly extends to a pivot point 44, and then further formed by bonding a second planar component 64 from along pivot point 44, wherein the second planar component 64 extend to an end point 74, as illustrated in FIGS. 5 and 6. In certain embodiments, the peripheral rim 14 may be formed by a unitary L-shaped component and/or an L-shaped component formed from a plurality of constituent planar components.

The peripheral rim 14 may be biased in the L-shape, though substantially pivotably about the pivot point 44 and/or the second edge 34 to a generally unbiased state. As a result, the peripheral rim 14 may be positionable in a folded up position and a folded down position enabling a "turn-back" property. This "turn-back" property is urged by the U-shape biasing, creating a self-securing "hugging effect" about an elongated object that the peripheral rim 14 extends from a first side thereof, and then "turns back" down the second side thereof. The "turn-back" property enables the adaptable barrier 10 to conform to different sized spaces defined by the elongated object(s), for example a truck bed 18 of a pickup truck 16 defined by the truck's rails 20 (the elongated object).

The adaptable sidewall 30 may provide a drain conduit 11 therethrough for draining a fluid 24. The drain conduit 11 may have a conduit plug/valve 12 removably mounted thereto. The drain conduit 11 may be disposed along the rectangular sidewall 30 on a short rectangular leg so that it faces a tailgate 22 when used in a truck bed 18, as illustrated in FIG. 2.

The method of using the present invention may include the following. The adaptable barrier 10 disclosed above may be provided. With the tailgate 22 in the closed/shut position, a user may position the adaptable barrier 10, with the peripheral rim 14 in the folded up position, in the truck bed 18 of a pick-up truck 16 so that the drain conduit 11 faces the tailgate 22. The adaptable sidewall 30 may conform to the interior structure of the truck bed 18, for example, by dimpling and bending to stretch to the truck bed top-rails 20 while accommodating wheel well housings. The user may move the peripheral rim 14 to the folded down position so that the peripheral rim 14 folds over at least one of the truck bed top-rails 20. In certain embodiments, the peripheral rim 14 and/or the sidewall 30 may dimple in the corners to accommodate the stretch to the truck bed top-rails 20. After ensuring that the drain plug/valve 12 is in a closed position, the user may fill the compartment with a fluid 24, such as water, to the desired level. Upon completion of use of the fluid-filled compartment, the user may open the drain plug/valve 12 to allow the fluid 18 to drain from the compartment and through cracks on underside of tailgate 22. Alternatively, the user may first let down the tailgate 22 prior to opening the drain plug/valve 12. When the fluid 18 has drained, the user may remove the adaptable barrier 10.

In certain embodiments, the adaptable barrier 10 can be used as a bathtub for hygienic bathing, to convert a truck bed into a watertight ice chest for serving food and beverages at outdoor events, or otherwise be inserted into any suitable cavity so as to provide a watertight compartment.

It should be understood, of course, that the foregoing relates to exemplary embodiments of the invention and that modifications may be made without departing from the spirit and scope of the invention as set forth in the following claims.

What is claimed is:

1. An adaptable barrier for reception within a cavity defined by at least one elongated object, providing a watertight compartment therein, comprising:
   a base sheet comprising a front edge;
   a sidewall comprising an elastic material, wherein the sidewall comprises a first edge and a second edge, and wherein the sidewall provides a drain conduit,
   wherein the base sheet and the sidewall are connected along the front edge and the first edge, forming the watertight compartment, wherein an opening is defined by the second edge; and
   a peripheral rim comprising malleable material, wherein the peripheral rim is joined along the second edge, and wherein the peripheral rim is positionable in a folded up position to a folded down position operably engaging the at least one elongated object,
   whereby the peripheral rim urges a hugging effect on the at least one elongated object.

2. The adaptable barrier of claim 1, wherein the sidewall further comprises a plurality of constituent wall segments.

3. The adaptable barrier of claim 1, wherein the peripheral rim further comprises a L-shaped component of malleable material formed and biased in the L-shape, wherein two legs of the L-shaped component are pivotably positionable to form at least an I-shape,
   whereby the L-shape is the folded down position and the at least I-shape is the folded up position.

4. The adaptable barrier of claim 3, wherein one leg of the L-shaped component is generally pivotable about the second edge.

5. An adaptable barrier for reception within a cavity defined by at least one elongated object, providing a watertight compartment therein, comprising:
   a base sheet comprising a front edge;
   a sidewall comprising an elastic material, wherein the sidewall comprises a first edge and a second edge,
   wherein the base sheet and the sidewall are connected along the front edge and the first edge, forming the watertight compartment, wherein an opening is defined by the second edge, and wherein the sidewall provides a drain conduit; and a peripheral rim pivotably joined to the second edge, wherein the peripheral rim is a L-shaped component of malleable material formed and biased in the L-shape, wherein two legs of the L-shaped component are pivotably positionable to form at least an I-shape, and wherein the peripheral rim is positionable in a folded up position to a folded down position operably engaging the at least one elongated object, whereby the peripheral rim urges a hugging effect on the at least one elongated object.

6. The adaptable barrier of claim 5, wherein the sidewall further comprises a plurality of constituent wall segments.

7. The adaptable barrier of claim 5, wherein one leg of the L-shaped component is generally pivotable about the second edge.

8. An adaptable barrier for reception within a cavity defined by at least one elongated object, providing a watertight compartment therein, comprising:

a base sheet comprising a front edge;

a sidewall comprising an elastic material, wherein the sidewall comprises a first edge and a second edge, wherein the base sheet and the sidewall are connected along the front edge and the first edge, forming the watertight compartment, wherein an opening is defined by the second edge; and a peripheral rim comprising malleable material, wherein the peripheral rim is joined along the second edge, and wherein the peripheral rim is positionable in a folded up position to a folded down position operably engaging the at least one elongated object, wherein the peripheral rim further comprises a L-shaped component of malleable material formed and biased in the L-shape, wherein two legs of the L-shaped component are pivotably positionable to form at least an I-shape, whereby the peripheral rim urges a hugging effect on the at least one elongated object.

9. The adaptable barrier of claim 8, wherein one leg of the L-shaped component is generally pivotable about the second edge.

* * * * *